March 9, 1937. E. L. WISE 2,073,397
SHAFT MOUNTING FOR WRITING COMPUTING MACHINES
Filed Oct. 19, 1935
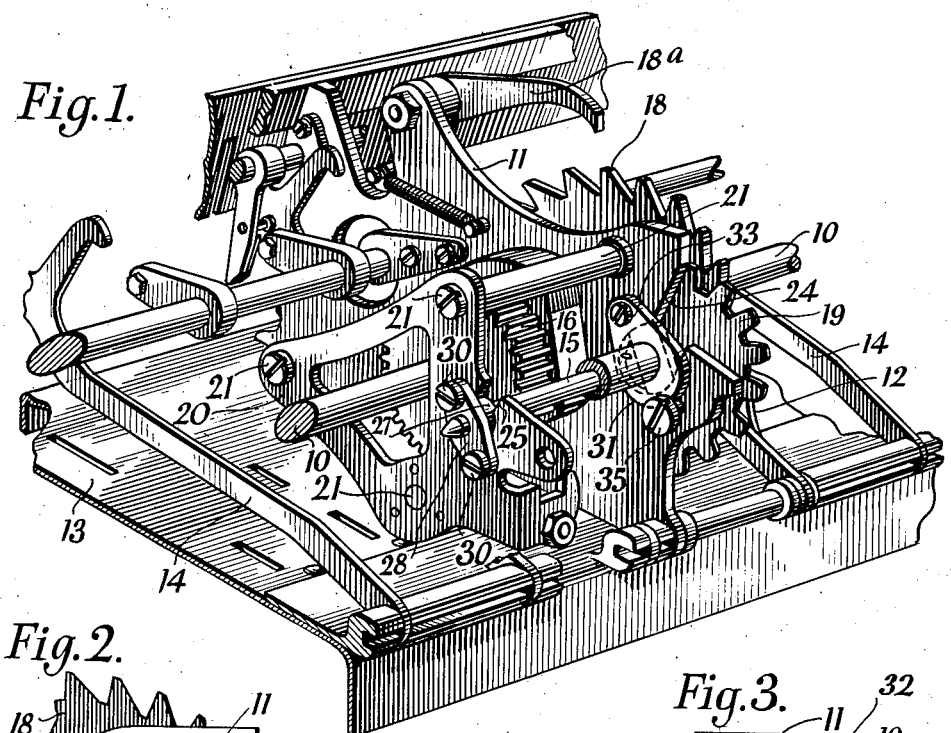
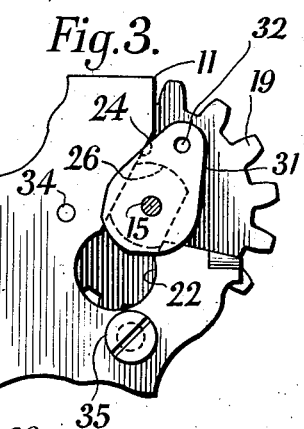
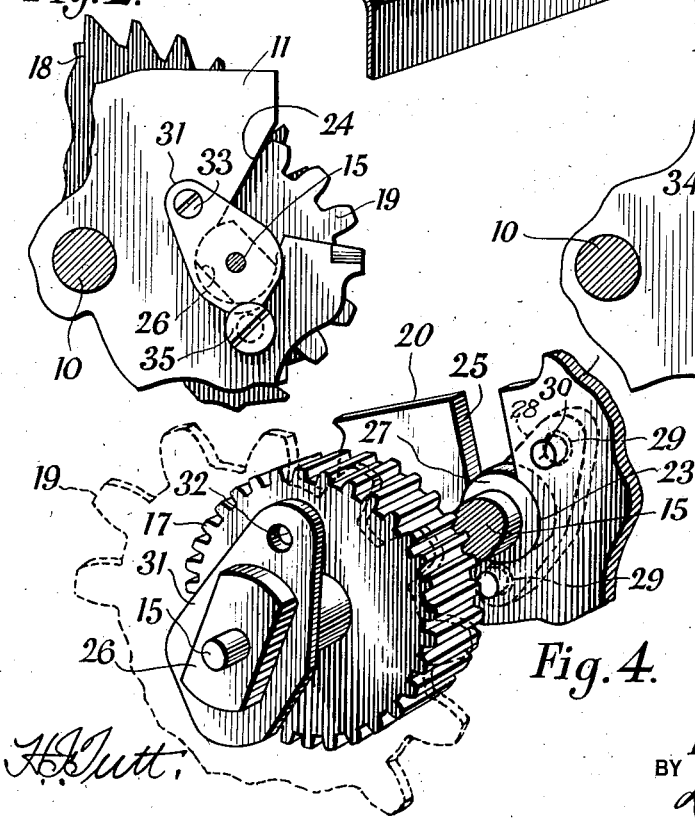
INVENTOR
Elmer L. Wise.
BY
ATTORNEY Patented Mar. 9, 1937

2,073,397

UNITED STATES PATENT OFFICE 2,073,397

SHAFT MOUNTING FOR WRITING-COMPUTING MACHINES

Elmer L. Wise, Bridgeport, Conn., assignor to Underwood Elliott Fisher Company, New York, N. Y., a corporation of Delaware Application October 19, 1935, Serial No. 45,706

2 Claims. (Cl. 308—24)

This invention relates more particularly to an improvement in writing-calculating machines of the type employing a master wheel or actuator, and a totalizer or register relatively movable in step by step increments to enter the digits of an amount one by one into the totalizer or register.

Heretofore, if it became necessary to make repairs or substitutions involving the removal and replacement of the master wheel or actuator, an inordinate amount of time and work was required, totaling an entire working day in many instances.

This resulted from the manner formerly in vogue of assembling the master wheel and its adjacent and co-acting parts, and was caused in part by the neccessity for providing means to insure the correct positioning of the master wheel, and its retention in such position against any possibility of displacement, so as to accurately mesh with the successive thin, narrow-faced adding wheel gears of the totalizer during the relative step by step movement thereof.

Also the necessity for condensing in small space the various mechanisms co-operating with the master wheel and differential mechanism required the removal of such associated mechanisms before access could be had to the master wheel mechanism for repair or removal.

I have contrived a simple and effective means for mounting the master wheel, which while preserving or retaining the prior essential and desirable requirements, enables the ready insertion and removal of the master actuator gear wheel and its shaft without disturbing any of the other parts closely adjacent thereto, which advantage constitutes one object of this invention.

To this end, I have provided bearings for both ends of the shaft, to one end of which shaft is secured the master actuator gear wheel, and have formed open seats in the usual shaft supports, to removably accommodate the bearings and shaft.

Another object of this invention is to provide a self-locking bearing adjustable in its seat to prevent accidental withdrawal, and to maintain the shaft and bearing in their proper positions to insure correct engagement of the master actuator wheel with the successive totalizer gears, the bearing being readily adjustable to a position to enable its ready removal with the master wheel shaft.

A further object is the provision of means to retain the bearing in locking position against accidental displacement laterally or endwise relatively to its seat.

A still further object co-related to the last two objects mentioned, is to combine the bearing retaining and adjusting means, and provide a locating means co-operating with the retaining means and the supports in which the seats are formed, to indicate to the operator when the bearing is in one of its locking positions.

To these ends, therefore, the invention includes certain novel features and combinations of parts, all of which will be more fully explained hereinafter, and particularly pointed out in the claims.

In the accompanying drawing,

Fig. 1 is a perspective view from the rear showing a fragmentary part of a machine of the Elliott-Fisher type, having the invention applied thereto;

Fig. 2 is a detailed side view in section, showing the self-locking bearing for the shaft mounting, in its normal locked position in its seat, with its retaining means effective;

Fig. 3 is a similar view, illustrating the manner of removing and inserting the self-locking bearing and shaft relatively to its seat; and Fig. 4 is a detail fragmentary perspective view of the shaft for the master actuator wheel, with its bearings, illustrating a convenient form of slot for that bearing farthest from the master actuator wheel.

The uppermost deck or cover plate of the traveling key carriage of an Elliott-Fisher writing-computing machine, carries a differential mechanism, as indicated in the early disclosure of U. S. Letters Patent to Laganke and Smith, No. 829,971, dated September 4, 1906, to impart differential movement to the master wheel shaft and the master wheel fast thereon, incident to depression of a numeral key, which depression also effects the imprint of the corresponding digit on the work sheet, and trips the usual letter spacing escapement.

In the above mentioned patent, the numeral keys operated directly upon the master wheel shaft.

With the advent of cross footer or grand total register mechanism, and the use of reversing gearing to effect subtraction as well as addition, it was found desirable to relieve the master wheel shaft of that part of the differential mechanism theretofore mounted on that shaft, and from the strain incident to direct action of the numeral keys thereon.

This was accomplished by providing a main or differential shaft operable directly by the numeral keys, and gearing such main or differential shaft, including a reversing train of gears, to a stub or master wheel shaft to which the master actuator wheel is secured, as shown in U. S. Letters Patent to Foothorap, No. 1,576,960, March 16, 1926, and No. 1,847,429, March 1, 1932, the ends of the stub shaft in the latter-named patent being journaled in vertical brackets spaced apart and mounted on the cover plate of the traveling carriage.

It is customary to mount the over-rotation preventing ratchet wheel on the main shaft in close overlapping relation to the master actuator wheel, the differential gearing, operated by a group of differential levers, being mounted on the same main shaft, and in the event that it became necessary to repair or replace the master actuator wheel, it was first necessary to practically dismantle the entire left section of the group of differential levers, and co-acting parts before the over-rotation preventing ratchet could be separated from the master actuator wheel a sufficient distance to enable access to and removal of the latter.

The present invention is designed, primarily, for the express purpose of enabling quick removal and replacement of the master actuator wheel and shaft without disturbing any of the co-related parts.

Second only in importance, is the idea of providing a suitable bearing for the master actuator shaft, which, with its shaft, will be insertable in and removable from assembled position, and which may be readily manipulated to firmly retain the shaft and master wheel in proper relation to the co-acting parts, and yet be easily and quickly adjusted to enable removal of the shaft and master wheel.

The usual main or differential shaft 10 is suitably journaled intermediate its ends in anti-friction bearings, not shown, supported, respectively, in a vertical center bracket 11 and an auxiliary bracket 12 mounted on the cover plate 13.

The customary key-controlled differential levers 14 impart oscillations of greater or less extent to the main shaft 10 in the usual manner, (not shown), which are transmitted to a master wheel shaft 15 through a gear 16, on the main shaft and a gear 17 on the master wheel shaft 15, between which is interposed a reverse gearing (not shown) to reverse the direction of rotation of the master wheel shaft, for purposes of addition and subtraction.

Suitable upper and lower pawls, the upper one 18ᵃ only being shown, engage and disengage an over-rotation preventing ratchet 18 fast on the main or differential shaft 10 to positively lock the latter and its intergeared parts, including the master wheel shaft 15, against accidental rotation in either direction.

The master wheel 19 is fast on that end of the master wheel shaft 15 which projects through the center bracket 11, the opposite end of the master wheel shaft projecting through a shift gear bracket 20 parallel with and secured in spaced relation to the center bracket 11 by posts 21 projecting laterally from the adjacent face of the center bracket.

The foregoing is not new, and constitutes a part of this invention only insofar as it cooperates with the novel features hereinafter explained.

The rear edges of the center bracket 11, and of the shift gear bracket 20 are each provided with an enlarged aperture or seat 22 and 23, respectively, (Figs. 3 and 4), the seats being in horizontal alinement, and each having a throat or opening 24 and 25, respectively, leading therefrom to the adjacent edge of its respective bracket, thereby providing what may be termed an "open seat" in each bracket.

These throats 24 and 25 are preferably of less width than the diameters of their respective seats, so as to leave as much of the bearing surface of the seats as possible, and also to form shoulders at the junction of the throats with the seats, to retain the master wheel shaft bearings in place against edgewise movement.

The master wheel shaft bearings 26 and 27 shown, are of two forms, one of which, 27, is intended for slight adjustment transversely of its seat; and the other, 26, is adapted to fit snugly in its seat, admitting of rotary adjustment only therein.

The floating or left hand master wheel shaft bearing 27 (Fig. 1, and shown at the right in Fig. 4) comprises a cylindrical, apertured bearing member, one face of which is fast to the center of a locking plate 28, preferably elliptical in shape, and having holes 29 formed in its opposite ends, to accommodate fastening means, as screws 30, taking into the outer face of the shift gear bracket 20.

The locking plate 28 is apertured in alinement with the opening in the bearing 27 to enable the bearing and plate to be threaded endwise onto the master wheel shaft 15, the bearing 27 being inserted laterally into its seat, as its circumference is larger than the throat 25 leading into the seat.

The holes 29 in the locking plate are slightly larger than the shanks of the fastening means 30 (as indicated in Fig. 4) to enable a slight adjustment of the bearing 27, with its plate and the master wheel shaft 15 with its gear 17, relatively to the train of gears communicating motion thereto, of which drive gear 16 forms an element, whereby a proper meshing of the gears is obtained.

The inner master wheel shaft bearing 26 comprises an apertured self-locking member having two opposed flat sides and two opposed arcuate ends, formed by slabbing two opposite sides of a cylindrical bearing. The diameter of the bearing 26 between the parallel flat sides is sufficiently less than the width of the throat 24 of its seat 22 formed in the center bearing, to enable the passage of the bearing 26 endwise through the throat, the distance between the opposed arcuate ends of the bearing being a trifle less than the diameter of the seat 22, to enable the bearing to fit snugly therein and rotate without lost motion.

A retainer plate 31 substantially ovate in shape, is fast to one end of the bearing, and is apertured in line with the bearing to accommodate the master wheel shaft.

A hole 32, (Figs. 3 and 4), is drilled near the smaller end of the ovate retainer plate for a fastening means, as a screw 33, (Figs. 1 and 2), to enter a threaded hole 34, (Fig. 3), in the center bracket 11.

The retainer plate 31 is of sufficient size to entirely cover the seat 22, the larger end of the plate having an extending lobe overlapped by the head of a clamping screw 35 threaded into the center bracket.

By turning the clamping screw down, its head co-acts with the lobe of the retainer 31 to hold the retainer plate and bearing in place.

The use and operation of this self-locking bearing is readily appreciated.

The master wheel 19 is first secured fast on one end of the master wheel shaft 15, the ends of which may be reduced, as indicated in the drawing, after which the self-locking bearing and retainer is threaded loosely on the shaft with the flattened bearing facing the master wheel. The driven gear pinion 17 is then slid onto the shaft 15 to which it is pinned, thus confining the bearing 26 between the hub of the gear 17 and the master wheel 19.

This partial assembly is then inserted laterally at right angles to the longitudinal axis of the shaft, through the throats 24 and 25 of the seats, care being taken to position the bearing 26 so that its narrower diameter coincides with the width of its throat 24, with one of the arcuate ends in the lead.

Also the assembler must use care to see that the bearing 26 is separated as far as possible from the master wheel 19 to afford space to accommodate the thickness of the center bracket 11, so that when the parts are assembled, the master wheel is adjacent the opposite face of the center bracket from that with which the retainer plate 31 contacts.

It will thus be seen that the master wheel shaft 15 is insertable into and removable from its seats in a direction transverse to its length and without necessitating removal and replacement of any parts not actually carried by the shaft.

When the leading arcuate end of the bearing 26 contacts the complementary concave portion of the seat 22 opposite and in line with the throat 24, the opposite or following arcuate end of the bearing just clears the inner end of the throat, whereupon the assembler, with a suitable tool, pushes against the smaller end of the retainer plate 31 to rotate the latter and the flattened bearing 26 in the circular seat 22 so as to position the longer axis of the bearing 26 substantially transversely of the throat 24 and cause the bearing to lock itself in its seat beneath the shoulders formed by the juncture of the throat and seat.

The assembler may utilize the fastening 33 of the retainer plate 31 to assist in properly locating the bearing in its locked position, by feeling for the threaded opening 34, while the fastening 33 is entered in its hole 32 in the retainer plate and the plate turned, the assembler being assured, when the inner end of the fastening finally registers with its opening 34, that the bearing 26 is in its self-locking position.

As a result of positioning the bearing 26 in locking relation with its seat, the lobe at the broader end of the retainer plate 31 is fully positioned beneath the head of the clamping screw 35. The floating bearing 27 and its locking plate 28 is then slid onto the free end of the master wheel shaft 15, the cylindrical bearing being inserted endwise into its seat 23, and the fastening screws 30 entered into the holes 29 in the adjustable locking plate 28, and the corresponding holes in the shift gear bracket 20.

The mesh of the driven gear 17 with its coacting gear (not shown) is then adjusted, after which the fastening means 30 and the screws 33 and 35 are tightened to hold the parts where adjusted.

Removal of the master wheel shaft 15 is just as readily effected, by first removing the fastening means 30 and withdrawing the floating bearing 27 and its plate 28 from the seat 23, then loosening the clamping screw 35, removing the fastening means 33, and turning the smaller end of the ovate retainer plate 31 until it "points" out of the throat, i. e. lies substantially parallel therewith, which indicates that the arcuate leading end of the bearing is aligned with the throat, after which the master wheel shaft 15 with its master wheel 19, gear 17 and self-locking bearing 26 may be withdrawn through the throats 24, 25 for repair or replacement.

Obviously the locking plate 28 and retainer plate 31, when fastened to their respective brackets 20 and 11, prevent endwise movement of the bearings 27, 26 out of their seats.

What I claim as new, is:—

1. The combination with toothed members adapted for interengagement; of means to removably and adjustably support one of the toothed members in proper meshing engagement with the other, including a rotatable shaft; spaced supports therefor, having seats formed therein with open throats of less diameter than the seats, leading therefrom to enable insertion and removal of the shaft relatively to the seats; a self-locking bearing in which the shaft is journaled, the bearing insertable in and removable from its seat through one of the throats, with the shaft, and rotatable in its seat relatively to the shaft; a second bearing spaced apart from the first-named bearing and being a floating bearing of greater diameter than the throat leading to its seat, and axially applied to and removed from the shaft and its corresponding seat; apertured non-circular flanges on the respective bearings; means to secure the flanges to their respectively adjacent supports; and a headed clamping device carried by the support adjacent the self-locking bearing, the flange of the self-locking bearing adapted to enter the space between the head of the clamping device and its support, when the bearing is rotated to locking position, to be held in place by the clamping device.

2. In a shaft mounting, the combination with a shaft; of supporting means therefor having a seat formed therein; a bearing in which the shaft is journaled, the bearing removably and rotatably insertable into the seat; an eccentric flange on the bearing adapted to contact a face of the support; and a headed clamping device carried by the support adjacent the flange, which flange is adapted to enter the space between the head of the clamping device and the support when the bearing is rotated to locking position, to be releasably held in place together with the bearing, by the clamping device, when the device is turned down.

ELMER L. WISE.